US010819820B1

(12) United States Patent
Zhu et al.

(10) Patent No.: US 10,819,820 B1
(45) Date of Patent: Oct. 27, 2020

(54) ON-PATH DATA CACHING IN A MESH NETWORK

(71) Applicant: Amazon Technologies, Inc., Seattle, WA (US)

(72) Inventors: Yi Zhu, San Jose, CA (US); Varadarajan Gopalakrishnan, Cupertino, CA (US); Kiran Kumar Edara, Cupertino, CA (US); Xi Chen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 15/469,221

(22) Filed: Mar. 24, 2017

(51) Int. Cl.
*H04L 29/08* (2006.01)
*H04L 29/06* (2006.01)
*H04W 84/18* (2009.01)

(52) U.S. Cl.
CPC ...... *H04L 67/2842* (2013.01); *H04L 67/1095* (2013.01); *H04L 69/16* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,956,818 B1* | 10/2005 | Thodiyil | H04L 47/522 370/230 |
| 9,525,713 B1* | 12/2016 | Zuevsky | H04L 65/601 |
| 9,736,699 B1* | 8/2017 | Rao | H04W 4/80 |
| 2006/0173970 A1* | 8/2006 | Pope | G06F 13/28 709/216 |
| 2008/0240111 A1* | 10/2008 | Gadelrab | H04L 49/9063 370/395.7 |
| 2009/0175216 A1* | 7/2009 | Bozarth | H04L 67/125 370/328 |
| 2011/0007678 A1* | 1/2011 | Kneckt | H04W 40/10 370/311 |
| 2011/0145533 A1* | 6/2011 | Raisch | G06F 12/02 711/165 |
| 2012/0082163 A1* | 4/2012 | Rothenberg | H04L 45/00 370/392 |
| 2012/0120965 A1* | 5/2012 | Khawer | H04L 49/9031 370/412 |
| 2015/0006402 A1* | 1/2015 | MacArthur | G06Q 20/1235 705/57 |

(Continued)

*Primary Examiner* — Dhairya A Patel
(74) *Attorney, Agent, or Firm* — Lowenstein Sandler LLP

(57) ABSTRACT

A mesh network device includes a content repository including a first section to store original data and a second section to store cached data, and an application processor including a user space, kernel space, and an on-path data caching engine. The on-path data caching engine is to receive, from a second mesh network device, data frames via a data link layer of a TCP/IP mesh network. The data frames include audio or video content. The on-path data caching engine is further to store the data frames in a socket kernel buffer, determine that a third mesh network device is a destination for the data frames, and forward the data frames to the third mesh network device. The on-path data caching engine is to determine that the audio or video content is to be cached and asynchronously copy the audio or video content to the second section of the content repository.

17 Claims, 12 Drawing Sheets

(56) References Cited

U.S. PATENT DOCUMENTS

2016/0072865 A1\* 3/2016 Kaplinger ............... H04L 67/06
709/213
2016/0345319 A1\* 11/2016 Zhou ................. H04W 72/0446
2018/0225204 A1\* 8/2018 Choudhari .......... G06F 9/45558

\* cited by examiner

ON-PATH DATA CACHING IN A MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of various embodiments, which, however, should not be taken to be limited to the specific embodiments, but are for explanation and understanding only.

DETAILED DESCRIPTION

Figure 1:
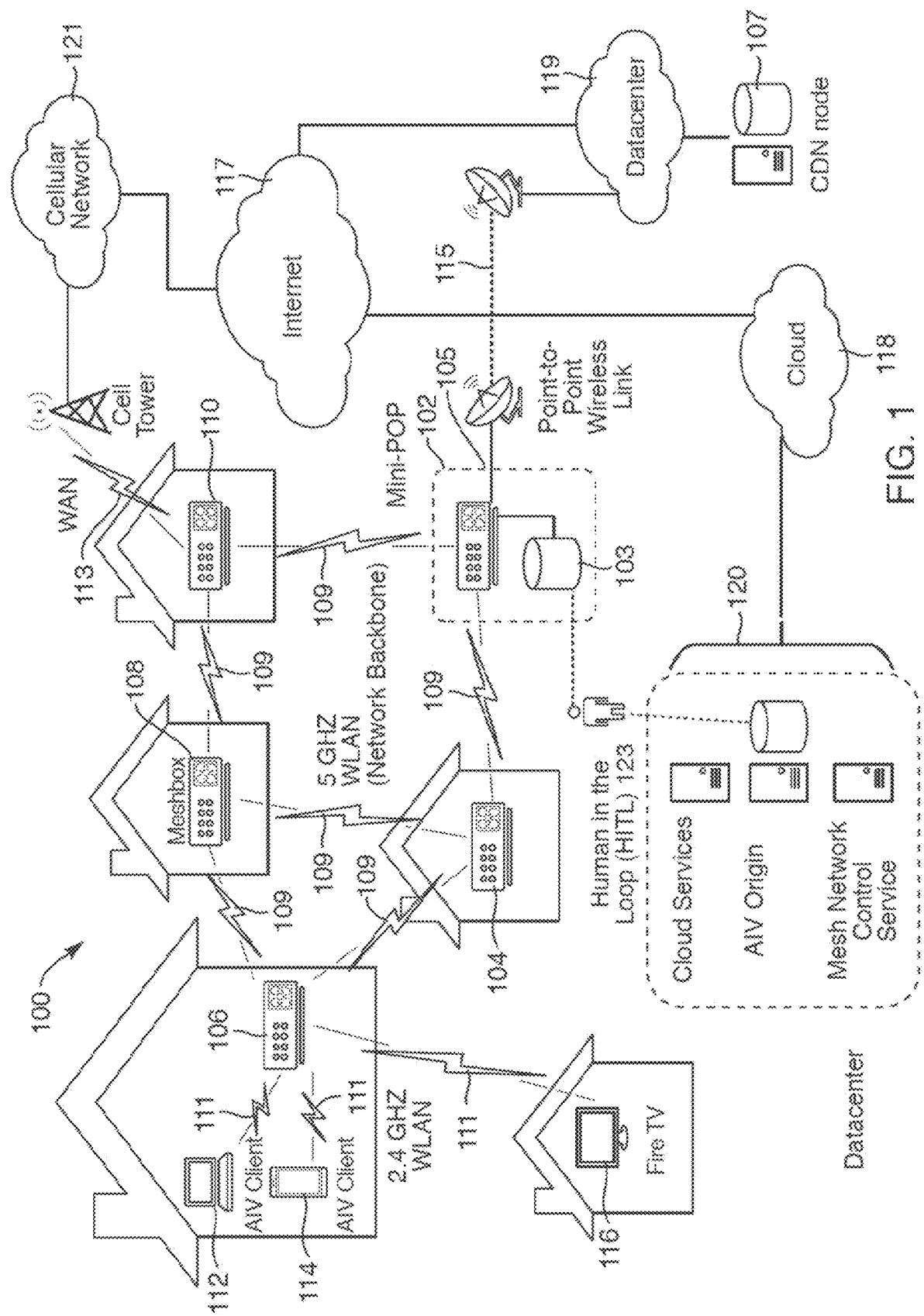
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

In one embodiment of a transmission control protocol/internet protocol (TCP/IP) network, nodes (e.g., gateways, routers, mesh network devices, etc.) discard data packets after they are finished forwarding them to the next destination. In another embodiment, it may be advantageous to cache data content of data packets on forwarding nodes for future use. Described herein are embodiments directed to on-path data caching in mesh network devices organized in a WMN. On-path data caching in a TCP/IP network allows an intermediary TCP/IP mesh network device to cache data content that is on the path to a final destination mesh network device.

In one embodiment, content of transmitted data packets are delivered to a user space of a forwarding mesh network device while being forwarded to the next mesh network device by the kernel. In some cases, a processing device of a mesh network device includes a content repository to store data content. The content repository may include a first section to store original data (data originally stored on the mesh network device) and a second section to store cached data (data originally stored on a different mesh network device), and an application processor operatively coupled to the content repository. The application processor may include a user space, a kernel space, and an on-path data caching engine. The on-path data caching engine may receive to the kernel space, from a second mesh network device, data frames (e.g., unicast and/or broadcast) via a data link layer of a TCP/IP mesh network. In one embodiment, the data frames include data content and a content identifier (CID) that identifies the data content. The on-path data caching engine may store the data frames in a buffer associated with the kernel space, determine that a third mesh network device in the data link layer of the mesh network is a destination for the data frames, and forward the data frames to the third mesh network device. The on-path data caching engine may also determine that the data content of the data frames is to be cached, and asynchronously copy (cache) the data content of the data frames from the buffer of the kernel space to the second section (e.g., the cache data section) of the content repository. Advantageously, this allows intermediary mesh network devices (mesh network devices that are not the final destination of transmitted data content) to cache data content for future use.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. A resource (or generally a content item, content file, or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver services or resources, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices are capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 8:
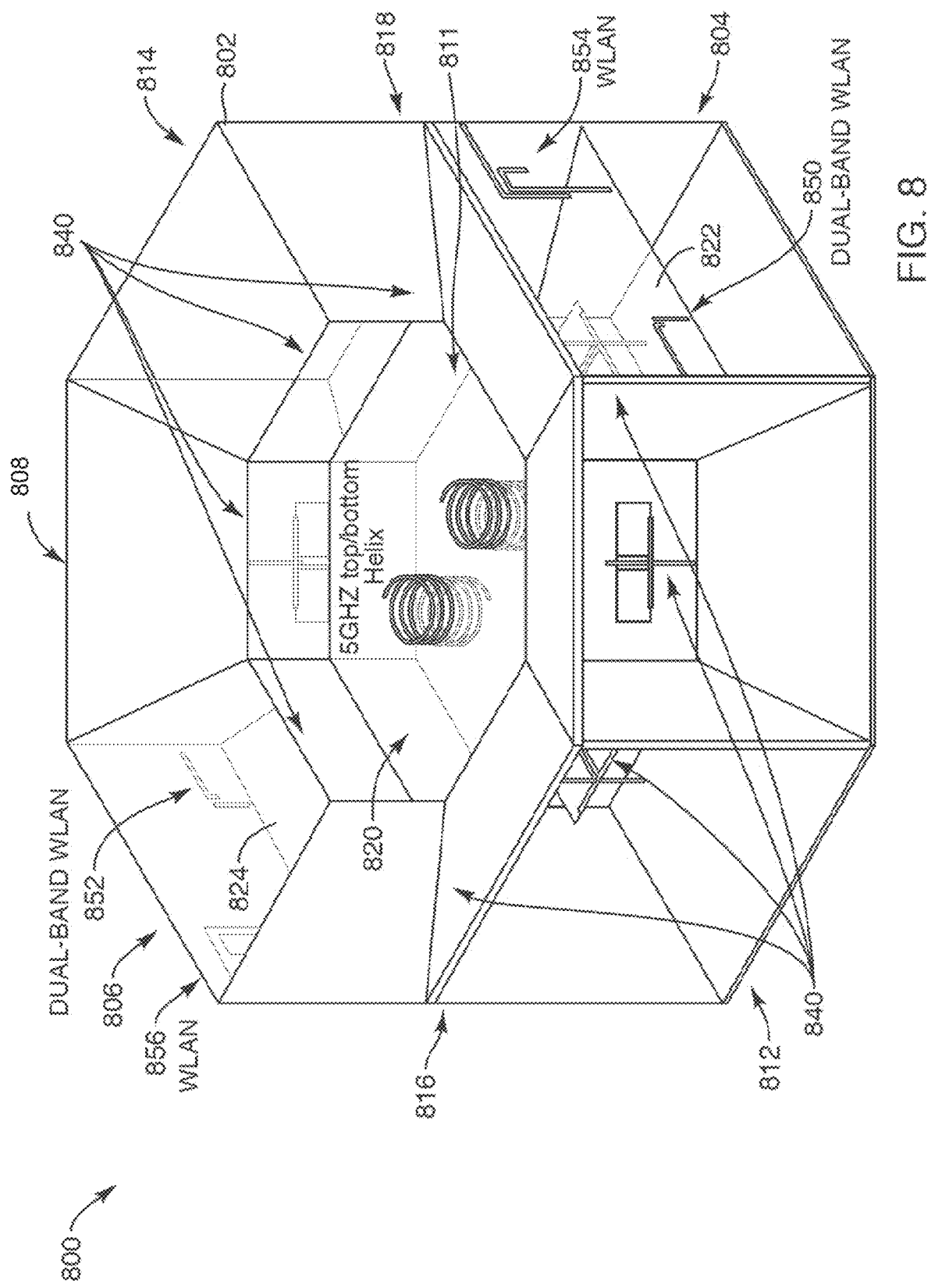
FIG. 8 illustrates a multi-radio, multi-channel (MRMC) network device according to one embodiment.
Figure 9:
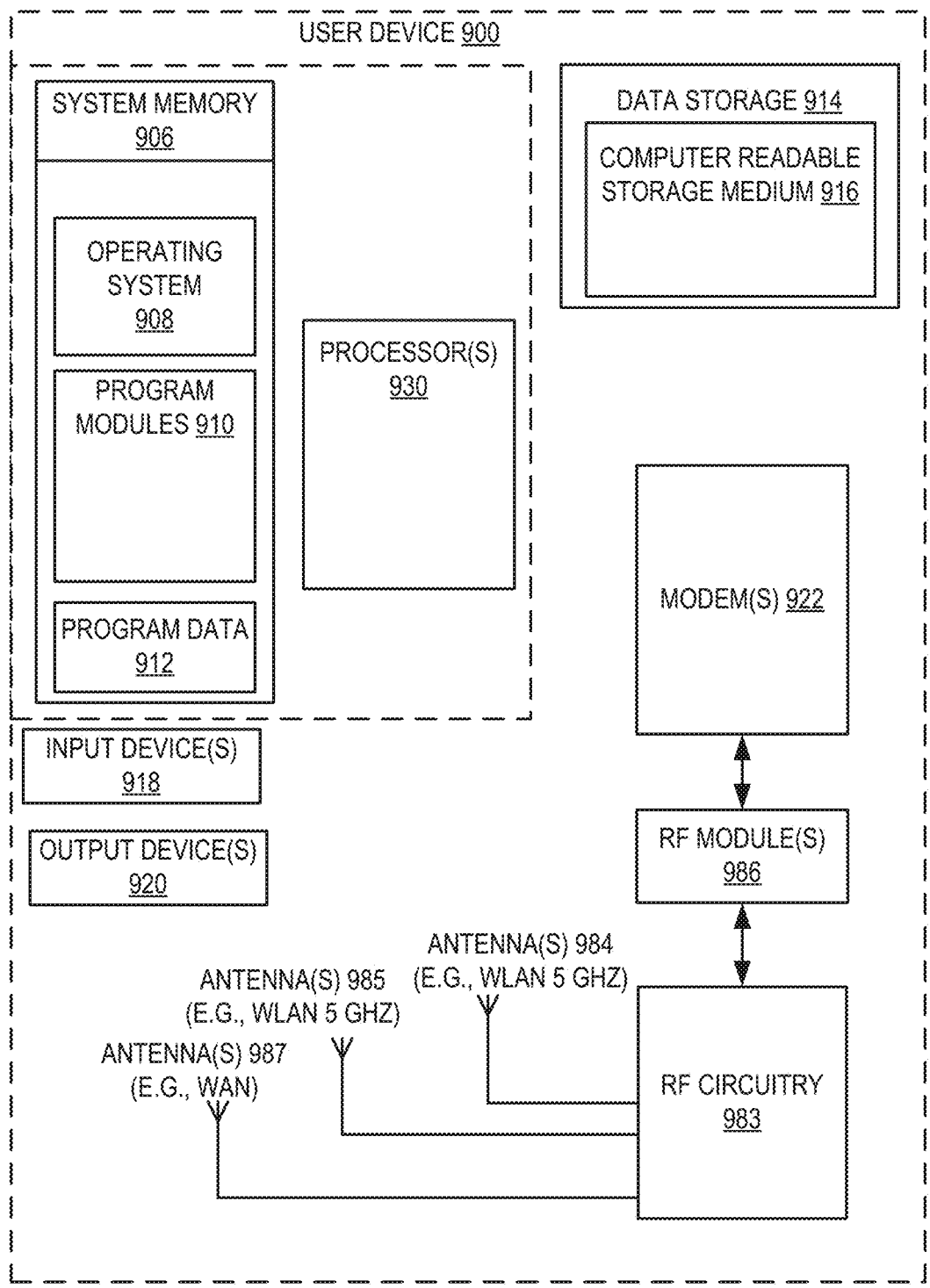
FIG. 9 is a block diagram of a network hardware device according to one embodiment.

FIGS. 1-5 are generally directed to network hardware devices, organized in a wireless mesh network, for content distribution to client consumption devices in environments of limited connectivity to broadband internet infrastructure. The embodiments described herein may be deployed in these network hardware devices. FIGS. 6-7 are generally directed to using on-path data caching to cache data traffic on a network backbone of the WMN of mesh network devices. FIGS. 8-9 are generally directed to multi-radio, multi-channel (MRMC) mesh network devices that may implement various embodiments described herein.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wirelessly connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combating the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
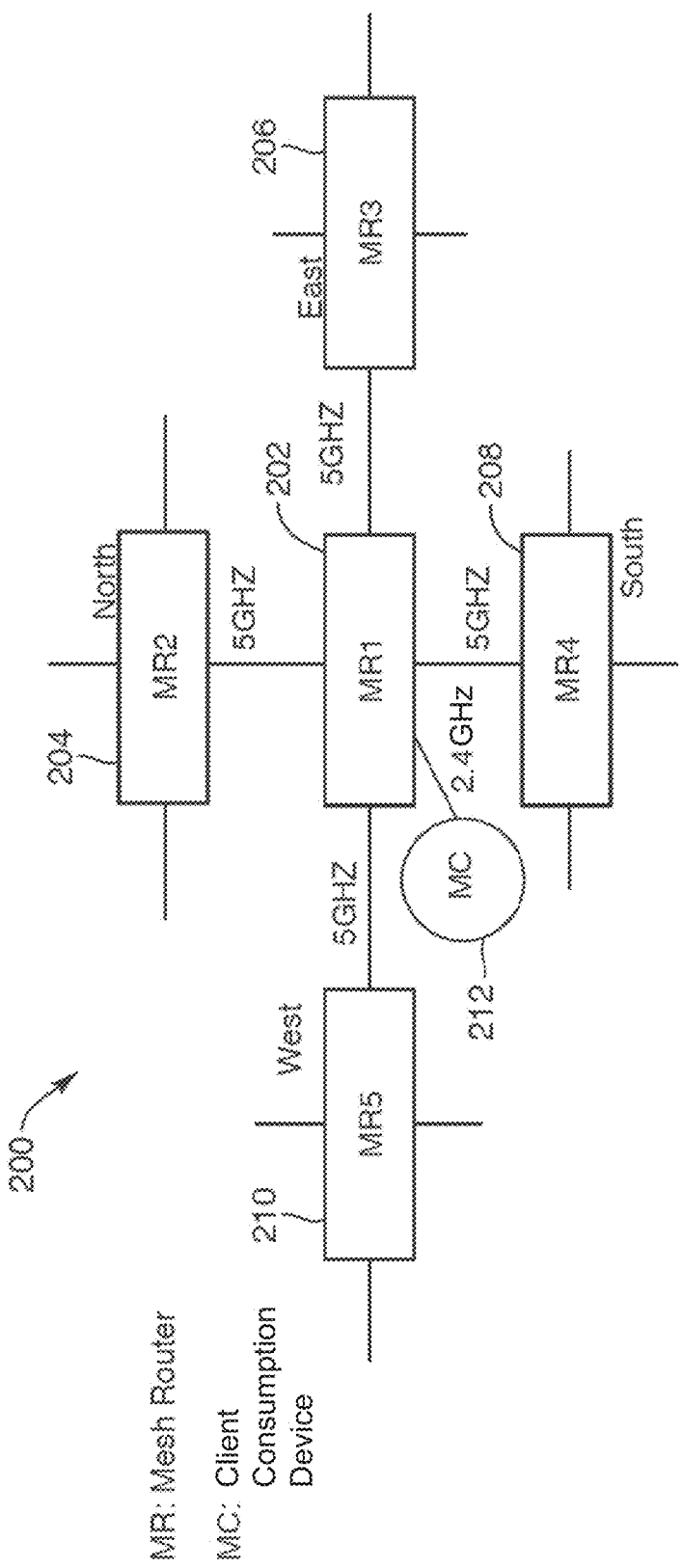
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
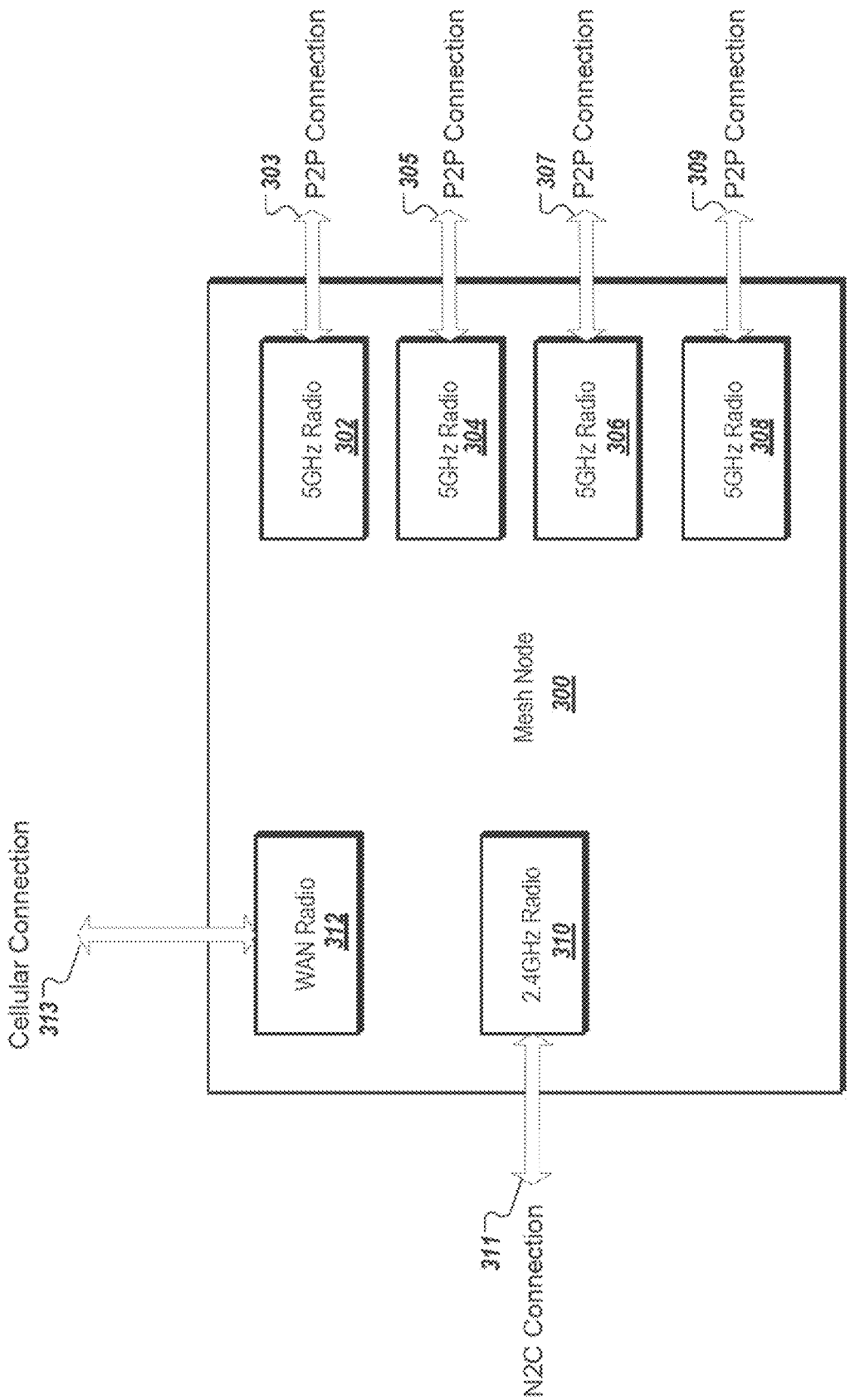
FIG. 3 is a block diagram of a mesh node with multiple radios according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receives the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. For example, a scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate. It should be noted that the scaling factor of 1.4 is just an example. In other cases, the scaling factor can be determined by a lot of factors, such as CPU architecture, number of cores, Wi-Fi® target offloading mode, NPU offload engine, software forwarding layers (L2 vs L3), or the like.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 4:
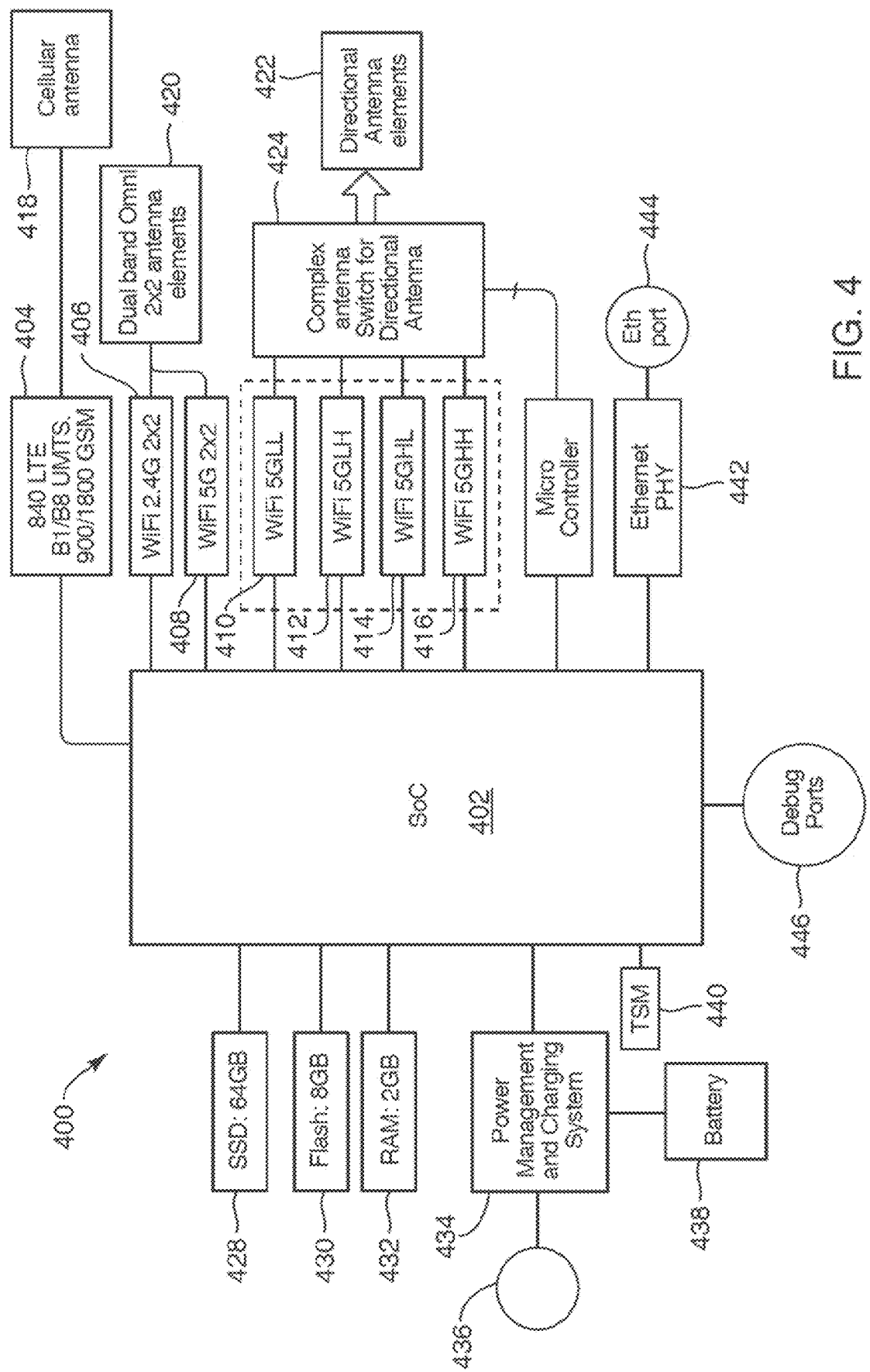
FIG. 4 is a block diagram of a mesh network device according to one embodiment.

FIG. 4 is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B 1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("5GLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

Figure 5:
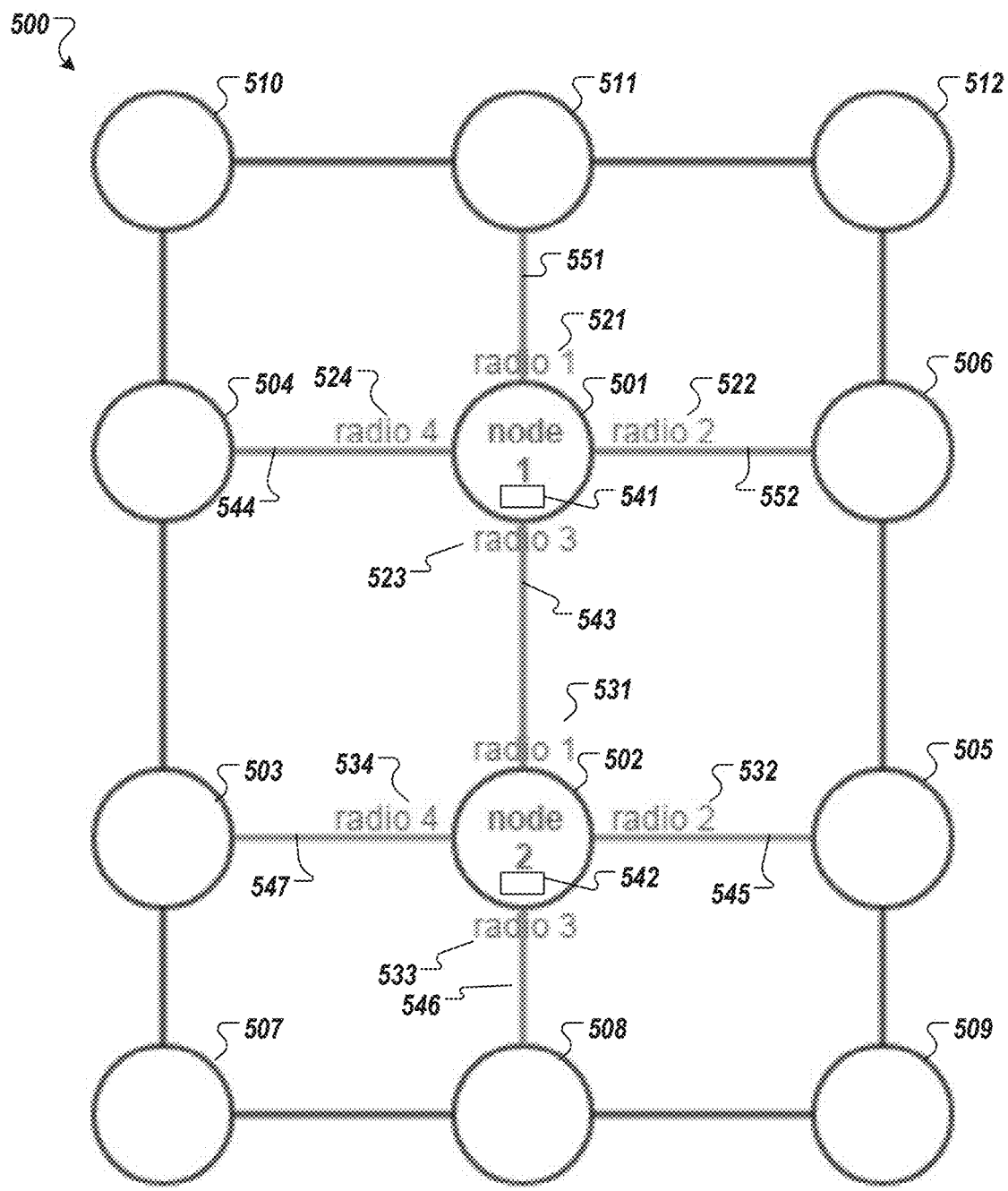
FIG. 5 is a diagram of a WMN with twelve network hardware devices, each having four radios to form a network backbone of peer-to-peer (P2P) wireless connections according to one embodiment.
Figure 6:
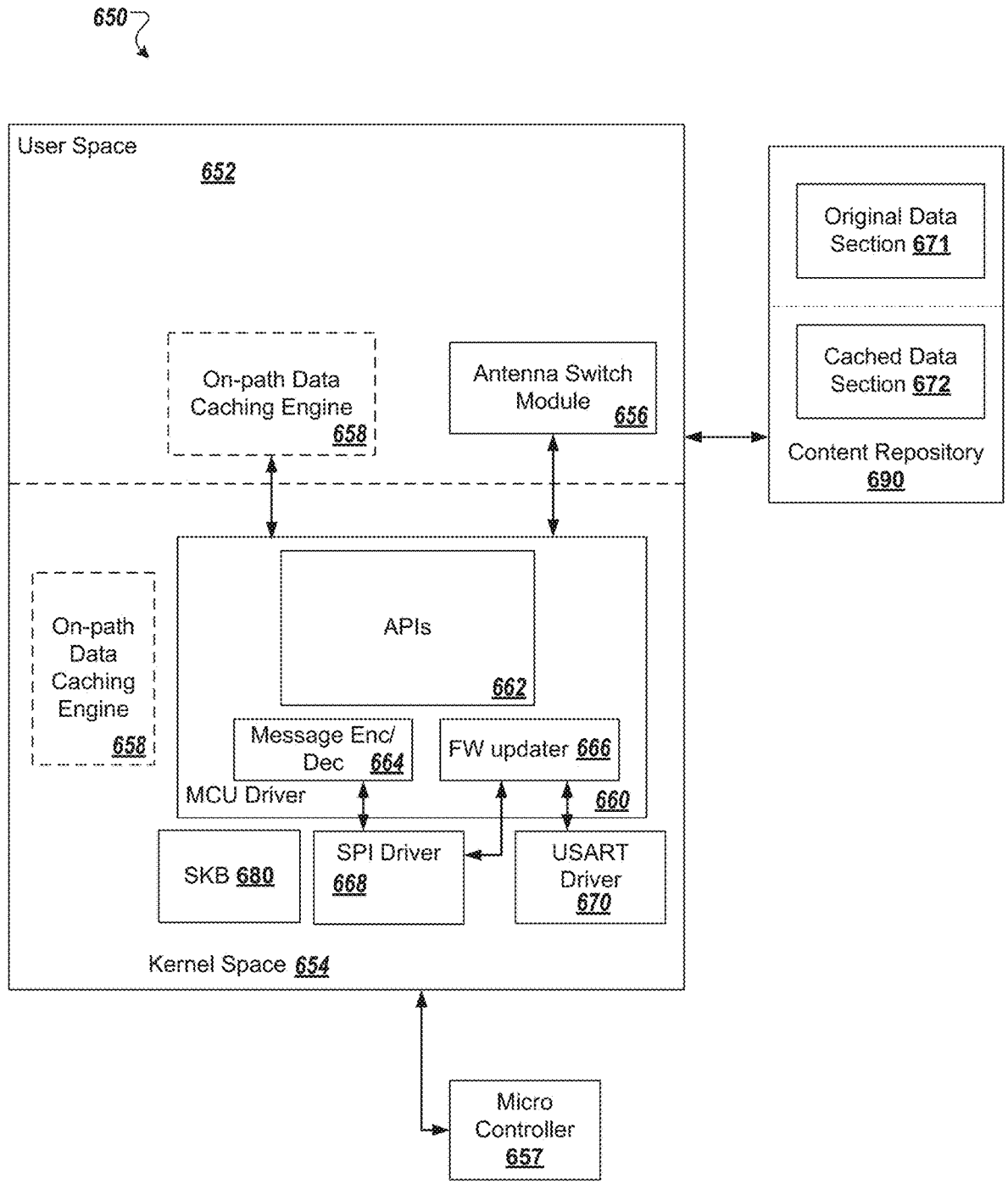
FIG. 6 is a block diagram of an application processor in which an on-path data caching engine may be implemented according to one embodiment.

FIG. 5 is a diagram of a WMN 500 with twelve network hardware devices 501-512, each having four radios to form a network backbone of peer-to-peer (P2P) wireless connections according to one embodiment. The WMN 500 includes multiple network hardware devices 501-512, referred to as nodes 501-512 for ease of description. In other embodiments, the WMN 500 may include more or less devices than twelve. The nodes 501-512 may be considered mesh routers (e.g., mesh network devices) that include four radios (e.g., four 5 GHz radios) for the network backbone for multiple connections with other mesh routers. For example, an eleventh node 511 may be located to the north of the first node 501 and connected over a first wireless connection 551 (e.g., 5 GHz connection). The sixth node 506 may be located to the east of the first node 501 and connected over a second wireless connection 552. The second node 502 may be located to the south of the first node 501 and connected over a third wireless connection 543. The fourth node 504 may be located to the west of the first node 501 and connected over a fourth wireless connection 544. In other embodiments, additional network hardware devices can be connected to other wireless connections of the first node 501. Similarly, the second node 502 can be connected to a third node 503 over a wireless connection 547, a fifth node 505 over a wireless connection 545, and an eighth node 508 over a wireless connection 546. It should also be noted that the nodes 503-512 may also connect to other nodes using its respective radios. It should also be noted that the locations of the nodes 501-512 can be in other locations that north, south, east, and west. For example, the nodes can be located above or below the first node 501, such as on another floor of a building or house.

The first node 501 includes a first radio 521, a second radio 522, a third radio 523, and a fourth radio 524. The first node 501 may also include at least one radio to establish a wireless connection (e.g., 2.4 GHz) with one or more client consumption devices. The first node 501 may operate as a mesh router that has four radios operating concurrently or simultaneously to transfer mesh network traffic, as well as a radio to service connected client consumption devices. This may require that the 5GLL and 5GLH to be operating simultaneously and the 5GHL and 5GHH to be operating simultaneously, as described in more detail below. The second node 502 includes a first radio 531, a second radio 532, a third radio 533, and a fourth radio 534. The second node 502 may also include at least one radio to establish a wireless connection (e.g., 2.4 GHz) with one or more client consumption devices. The second node 502 may operate as a mesh router that has four radios operating concurrently or simultaneously to transfer mesh network traffic, as well as a radio to service connected client consumption devices.

For routing data traffic between nodes 501-512, a MUL architecture is used for routing decisions where each node implements a MUL. The MULs 541, 542 have been illustrated in the first node 501 and the second node 502, respectively. The other nodes implement a MUL, although not illustrated and labeled. The MUL is a software interface layer that interacts with the underlying physical (PHY) layer of the radios. For each node, there are four radios to serve the mesh backbone. Each physical radio is assigned its own MAC. A MAC address, also called physical address, is a unique identifier assigned to network interfaces for communications on the physical network segment. MAC addresses are used as a network address for most IEEE 802 network technologies. A node MAC address is assigned to each node and each node represents a virtual interface that can be assigned the node MAC address. Routing decisions can be made with this node MAC address. The node's multiple radios can also be assigned MAC address according to an MAC address assignment scheme. In one embodiment, a first portion of the MAC address (e.g., the most significant 45 bits of a 48-bit MAC address) can be fixed and an assignment of a second portion of the MAC address can be assigned to the virtual interface for the node and the individual radios. In this embodiment, there are 7 MAC addresses. The following table illustrates an exemplary address assignment scheme for this embodiment.

| Last 3 Bits of MAC address | MAC Address assignment |
| --- | --- |
| 0 | Node (Virtual Interface) |
| 1 | Radio 1 (directional) |
| 2 | Radio 2 (directional) |
| 3 | Radio 3 (directional) |
| 4 | Radio 4 (directional) |
| 5 | Omni 2.4 GHz Radio |
| 6 | Omni 5 GHz Radio |
| 7 | Reserved |

In this embodiment, it is assumed that each mesh node has 4 radios and each radio may communicate with at most one neighbor node. As noted herein, a radio can communicate with more than one neighbor node if they use the same channel and sector. A neighbor node is a node to which a node has established a wireless connection, such as a P2P wireless connection, without any intervening nodes between the node and the neighbor node. In this embodiment, the first node 501 includes four neighbor nodes, including the eleventh node 511 over the first wireless connection 551, the sixth node 506 over the second wireless connection 552, the second node 502 over the third wireless connection 543, and the fourth node 504 over the fourth wireless connection 544. In one embodiment, the WMN 500 implements the IEEE 802.11s mesh implementation for defining how wireless devices can interconnect to create a WLAN mesh network. The 802.11 is a set of IEEE standards that govern wireless networking transmission methods. They are commonly used today in their 802.11a, 802.11b, 802.11g, and 802.1 in versions to provide wireless connectivity in the home, office and some commercial establishments. The 802.11s is an IEEE 802.11 amendment for mesh networking.

In one embodiment, the MUL 541 sits on top of the four radios 521-524 and acts as a virtual interface for the first node 501. The MUL 541 owns the node MAC address. The MUL 541 keeps a list of the four radio network devices (abbreviated "radio netdevs"). The MUL 541 is also considered a netdev for an operating system's data stack for routing data traffic to and from the four radio netdevs. The MUL 541 creates and maintains a master routing table. In particular, the MUL 541 consolidates local routing tables from all four radios into the master routing table. The MUL 541 prioritizes routing based on a metric reported by the individual radios in the local routing tables. During operation, the MUL 541 decides to which radio of the first node 501 to forward the data frames. At most, there are four different routes to a single destination node, as described herein.

In one embodiment, the MUL 541 operates in a control plane and in a data plane. Operations by the MUL in control plane may include peering, path discovery, and messaging (such as to pause or resume radios), as described herein. In the data plane, the MUL 541 decides to which radio to forward the data frame based on the master routing table for transmitting data. All data frames received by the individual radios go to the MUL for forwarding decisions as described in more detail below.

It should be noted that although the depicted embodiment illustrates and describes twelve mesh nodes, in other embodiments, more than twelve mesh nodes may be used in the WMN 500. It should be noted that FIG. 5 is a simplification of neighboring mesh network devices for a given mesh network device. The deployment of forty or more mesh network device may actually be located at various directions than simply north, south, east, and west as illustrated in FIG. 5. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

FIG. 6 is a block diagram of an application processor in which an on-path data caching engine 658 may be implemented according to one embodiment. The application processor 650 executes an operating system that segregates memory (virtual memory) into user space 652 and kernel space 654. In this embodiment, on-path data caching engine 658 and antenna switching module 656 execute in the user space 652. In other embodiments, some or the entire on-path data caching engine 658 can be implemented in the kernel space 654. The on-path data caching engine 658 may be instructions that when executed by the application processor 650 perform various operations as described below with respect to FIGS. 7A-9. The application processor 650 can communicate with neighbor mesh network devices to route data traffic on a network backbone of multiple P2P wireless connections between the mesh network devices.

In the kernel space 654, a micro controller unit (MCU) driver 660 can execute. The MCU driver 660 may include multiple application programming interfaces (APIs) 662 to interface to other components, such as the radios and micro controller, as described herein. The APIs 662 can communicate messages to other components and may use a message encoder/decoder 664 to encode and decode these messages. The APIs 662 may include an API for getting firmware versions, an API for updating the firmware, and an API for getting radio information (e.g., radio configuration, antenna configuration, channel information, chamber/sector information, or the like). The MCU driver 660 may also include a firmware (FW) updater 666. Also, the kernel space 654 may include a serial packet interface (SPI) driver 668 and a Universal Synchronous/Asynchronous Receiver/Transmitter (USART) driver 670.

In one embodiment, there is an interface mechanism between the user space 652 and kernel space 654 that has minimum latency. For example, in cases when there is an invalid configuration being input by an application, such as the on-path data caching engine 658, the error should be reported as quickly as possible to the application. The application processor 650 may also include power management modules in the user space 652 or in the kernel space 654 since the application processor 650 could be operating in a battery-backed operating state during power outages.

In one embodiment, the SPI driver 668 can be used for messaging between the application processor 650 and the micro controller 657, and the USART driver 670 can be used for firmware updates. The application processor 650 can use general purpose input-output (GPIO) interrupts to drive antenna switching. The switching could even be done on a per-packet basis. The application processor 650 can store any configuration, such as GPIO configurations in non-volatile memory. Kernel space 654 may also include a socket kernel buffer (SKB) 680. In one embodiment, SKB 680 is a queue that allows for asynchronous communication with the kernel of kernel space 654. The SKB may be a first-in, first-out (FIFO) buffer, or any other buffer type, that stores packet data.

In one embodiment, application processor 650 is operatively coupled to a content repository 690. Content repository 690 may be a repository on a storage device that includes an original data section 671 to store original data and a cached data section 672 to store cached data. In one embodiment, original data may be data that originated on the mesh network device where it is stored. Original data associated with one mesh network device may be cached on a different mesh network device.

The following description is directed to on-path data caching in a mesh network with an example of a mesh network device having an application processor 650 and an on-path data caching engine 658. In one embodiment, on-path data caching engine 658 of the mesh network device may receive, from mesh network device, data content via a data link layer of the TCP/IP mesh network and store the data content in a buffer (e.g., SKB 680). On-path data caching engine 658 may determine that another mesh network device in the data link layer of the mesh network is a destination for the data content and forward the data content to the third mesh network device. On-path data caching engine 658 may also determine that the data content is to be cached and asynchronously copy the data content from the SKB 680 to the content repository 690 (e.g., to cached data section 672 of content repository 690). Additional details of on-path data caching operations of one-path data caching engine 658 are provided below with respect to FIG. 7A.

Figure 7A:
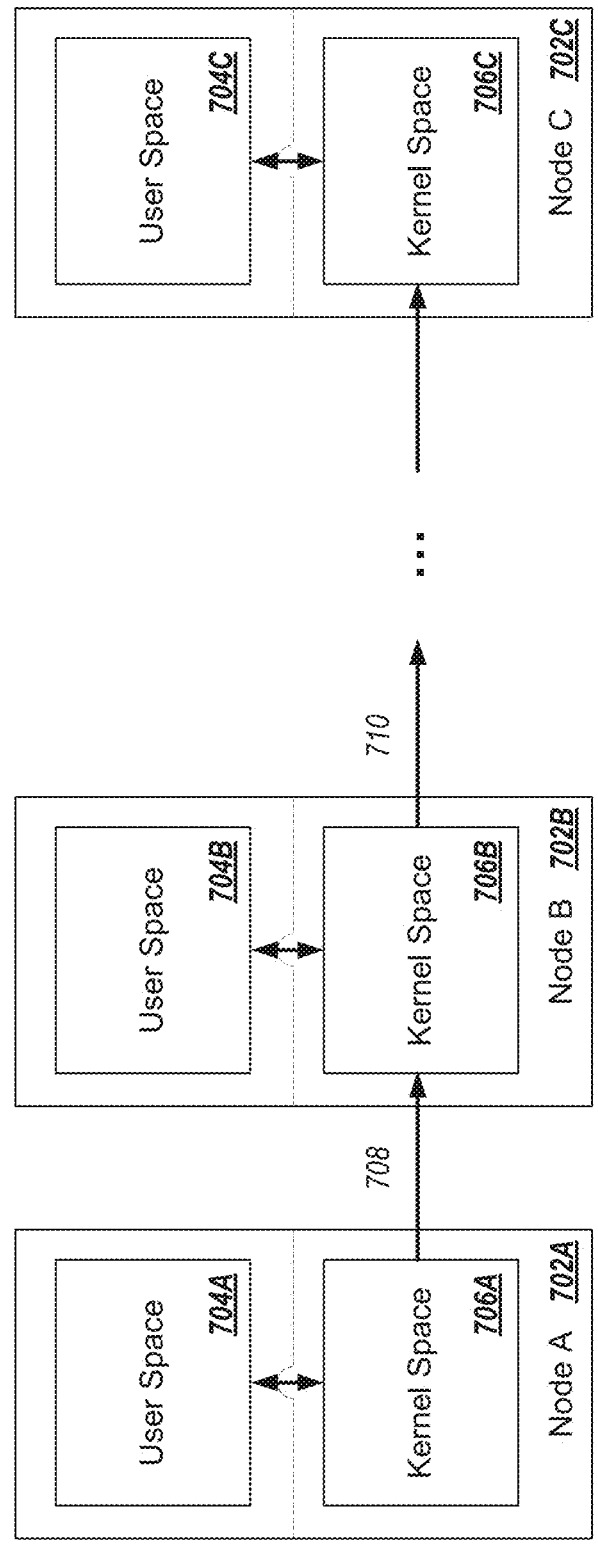
FIG. 7A is a diagram of a WMN with mesh network devices configured to perform on-path data caching operations according to one embodiment.

FIG. 7A is a diagram of a WMN with mesh network devices 704A-C configured to perform on-path data caching operations according to one embodiment. In this embodiment, nodes 702A-C are mesh network devices that include user space 704A-c and kernel space 706A-C. The kernels associated with kernel spaces 706A-C may be responsible for receiving and sending (forwarding) content data (e.g., in data frames via a data link layer of the mesh network) from one mesh network device to another. For example, data content may be sent 708 from kernel space 706A of node 702A, and node 702A may forward 710 the data content to eventually arrive and be received by the kernel of a destination node (e.g., 702C).

Specifically, node 702B may receive (e.g., to the kernel space), from a second mesh network device, multiple data frames (sent at 708) via a data link layer of a TCP/IP mesh network. In one embodiment, the data frames include data content and a content identifier (CID) that identifies the data content. In one embodiment, the CID may be a filename of the data content. The file name (e.g., the CID) may be a hash value (e.g., a secure hash algorithm 256 (SHA-256)_checksum of the data content itself. Advantageously, this allows for the assignment of CIDs to be unique to the content data. In one embodiment, the CID may be mapped to a source internet protocol (IP), destination IP, source port, and destination port of a TCP stream. Advantageously, the source IP, destination IP, source port, and destination port of the TCP stream may be used as a TCP CID to identify the corresponding data content in the TCP/IP mesh network. Before the TCP stream is decapsulated to determine the data content if the data frame. Node 702B may store the data frames in an SKB associated with the kernel space. Node 702B may perform a check of the data content to verify that the SKB has completely received the data frames without error. If the data content is successfully verified, node 702B may determine that a third mesh network device in the data link layer of the mesh network is a destination for the data frames and forward the data frames to the third mesh network device.

The kernel of node 702B may provide pointers (starting physical addresses) to the data frames in the SKB to a user space tool (e.g., on-path data caching engine 658 of FIG. 6). If the user space tool of node 702B determines that the data content of the data frames is to be cached, the user space tool may asynchronously copy the data content of the data frames identified in the SKB of the kernel space to a section of a content repository dedicated to cached data.

In one embodiment, cached contents on the content repository are managed by user space tool running on each node. As describe above, node 702B may include a content repository to store data content. In one embodiment, multiple nodes share a single content repository. In another embodiment, each node includes a single or multiple content repositories. Content repositories may include a first section to store original content and a second portion to store cached content. In one embodiment, a node decides when to start and/or stop caching to a content repository, whether the node should cache particular content (e.g., based on popularity of the content, trending content, etc.), and which cached content should be removed from the content repository first when the node is short on storage space. Each of the original data section and the cached data section of a content repository may utilize a different space quota and/or policy to evict data. When the total original or cached contents size of a particular section of the content repository size exceeds a size threshold, data from the corresponding section may be evicted. Various eviction policies, or any combination of them, may be utilized.

In one embodiment, to copy (cache) the data content, the pointers to the data content are stored in a ring buffer (e.g., a circular buffer, circular queue, etc.) for temporary handling. A ring buffer may be a data structure that uses a single buffer as if it were connected end-to-end. Data is stored into and read from the ring buffer in a circular fashion—when a read or write operation reaches the last location in the buffer, it continues to the first location. In one embodiment, the ring buffer is resizable. The ring buffer may be resized to accommodate the amount of data content (e.g., amount of data frames) stored in the SKB. When the SKB exceeds a defined storage threshold, the ring buffer size may be increased to handle additional pointers for the data content. When the SKB dips below the threshold, the ring buffer size may be decreased to reduce wasted space. The user space tool of node 702B may access the pointer to the starting physical address in the ring buffer and store the pointer to the starting physical address to a page table associated with a content repository.

In one embodiment, data frames copied to the content repository may be reassembled by the user space tool. In one embodiment, the data content is included in Ethernet frames (e.g., unicast frames) that are received and the user space tool decapsulates the associated IP, TCP and/or hypertext transfer protocol (HTTP) to reassemble the content data and store it to the content repository. In one embodiment, the various IP, TCP, and HTTP protocol layers of the data frame may be decapsulated by removing corresponding headers, protocol information, etc. Data content metadata may be stored into an in-memory content hash table (CHT) associated with the content repository. CHT may organize managed data content metadata in a search friendly data structure. CHT may periodically copy data content metadata to the content repository so that metadata survives during unexpected events (e.g., system crash, power outage, etc.).

In one embodiment, node 702B may receive a request from device requesting node, such as node 702A, for the data content. The request may include a content identifier (CID) of the data content. Node 702B may determine that the data content is stored in the content repository, lock the data content from being modified for a time duration, and send a notification to the requesting node indicating that the data content is stored in the content repository of node 702B. Alternatively, node 702B receives a request from the requesting node for the data content and determines that the data content is not stored in the content repository (i.e., the CID in the request is not found). Node 702B may send a notification to the requesting node indicating that the data content is not stored in the content repository. In some cases, node 702B may be aware where the data content resides elsewhere in the mesh network and share this information with the requesting node.

Figure 7B:
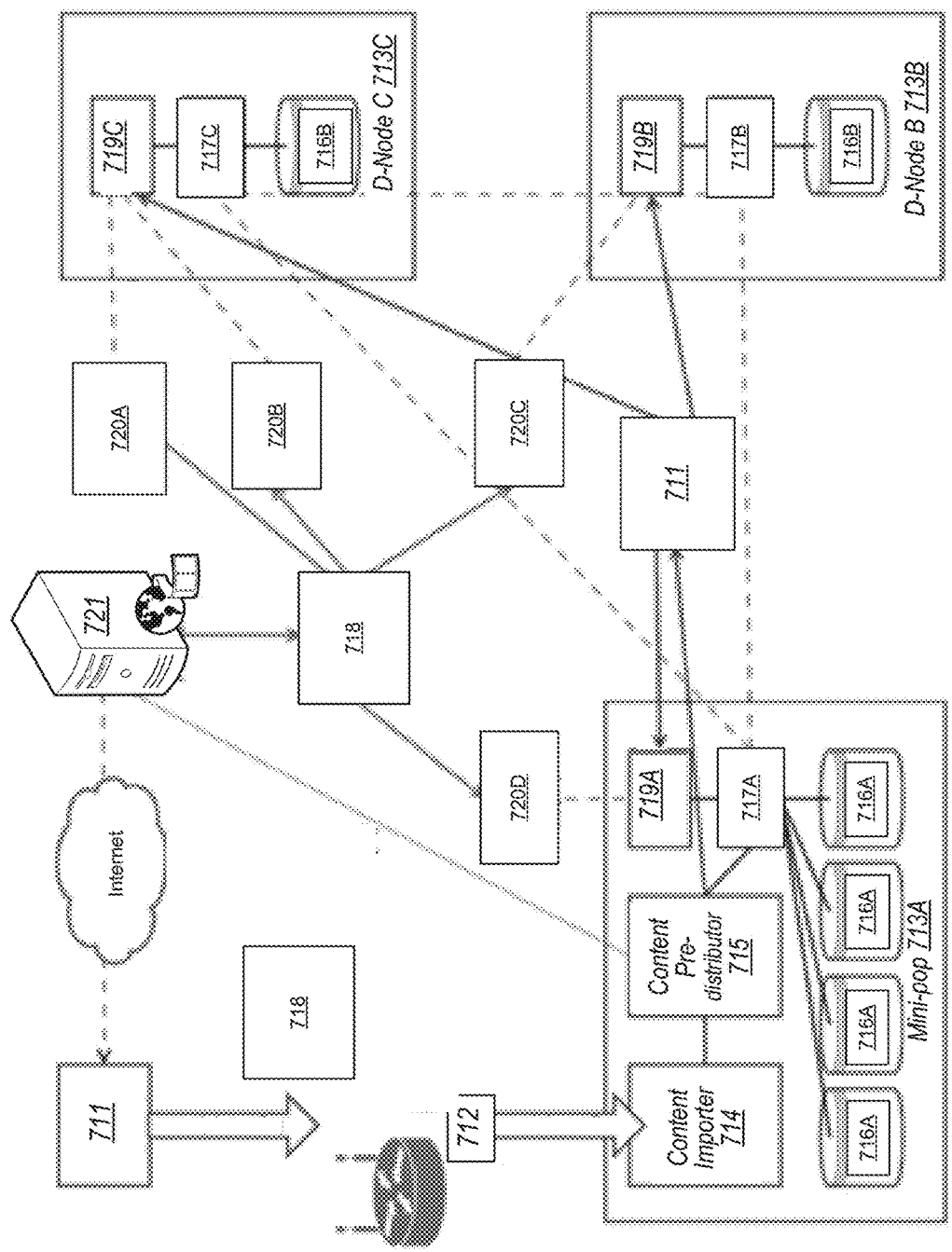
FIG. 7B is a diagram of a WMN with mesh network devices including a software architecture data plane in which an on-path data caching engine may be implemented according to one embodiment.

FIG. 7B is a diagram of a WMN 701 with mesh network devices 713A-C and client devices (e.g., AIV client devices 720A-D) including a software architecture data plane, on which an on-path data caching engine (e.g., on-path data caching engine 658 of FIG. 6) may be implemented according to one embodiment. In the depicted embodiment, one of the nodes is considered a mini-POP device (e.g., 713A) and the other are mesh nodes 713B, 713C, as described herein. In one embodiment, each node 713A-C runs a copy of a software layer daemon instance 717A-C. Daemons 717A-C may form a distributed content management system within the mesh network. In one embodiment, daemons 717A-C may be the on-path caching engine 658 of FIG. 6. In one embodiment, Daemons 717A-C are multi-threading programs that include a content reassembly thread, a content resolution thread, content service thread, and a cache management thread. When the threads compete for the CPU resources at the same time, they may be assigned priorities. In one embodiment, the content serving thread may be assigned first priority, cache management second, content reassemble third, and content resolution fourth. In another embodiment, other priorities may be assigned. Additional details of the daemon threads are discussed below with respect to FIGS. 7D-E.

In one embodiment of the WMN 701, daemons 717A-C manage the content 716A-C in the mesh network including modes (e.g., mini-POP devices) 713A-C in a distributed manner, and provides a common application program interface (API) to clients for high-speed, low-cost content access. Advantageously, mesh network bandwidth may be saved by continually moving (or caching) popular content closer to consumers in a heuristic manner. The data plane may hide distributed and low level topology information from individual nodes 713A-C, decrease content access time across the WMN 701, and provide for plug-and-play functionality for various caching algorithms to be used.

In one embodiment, when new content 716A-C is injected 711 into WMN 701 (e.g., via a content importer 714), the new content may be pre-distributed (e.g., by content pre-distributor 715) to multiple nodes 713A-C. The new content 716A-C can be injected into the mesh network by AIV server 721 over the Internet, as illustrated. The AIV server 721 can be a media server that serves the content to AIV clients 720A-720D as described herein. Alternatively, the new content 716A-C can be injected in other manners as described herein. By strategically choosing to which nodes to send new content in the pre-distribution stage, mesh network bandwidth may be saved, compared to placing new content on the same set of nodes each time. In one embodiment, popular content may be distributed to a larger amount of nods than less popular content. In one embodiment, content pre-distributor 715 may be an offline mechanism for pre-distribution of new content. Content pre-distributor 715 may receive various parameters as input. For example, content pre-distributor 715 may receive: a current cluster node topology corresponding to the mesh network, new content to be pre-distributed throughout the mesh network, and various metrics indicating the popularity of the new content (e.g. how frequently the new content has been requested in other mesh networks). In one embodiment, content pre-distributor 715 is a command-line tool that generates a pre-distribution mapping file (PDM) that maps the new content to various nodes 713A-C. Content pre-distributor 715 may call a software library (described with respect to FIG. 7C) of the software layer to deliver the new content to corresponding nodes 713A-C according to the PDM.

In one embodiment, the PDM may, utilize a consistent-hashing mapping scheme. In consistent hashing mapping schemes, lookup for particular content may be calculated using a hashing scheme and may not require the mapping to be stored in each node. Each node 713A-C maintains the IP or MAC addresses of log N nodes in the mesh network, where N is the number of nodes in the mesh network. Each nodes 713A-C maintains a node table, which may include the hash ID of every other node in the network. In one embodiment, the hash IDs are sorted in ascending order. Alternatively, the hash IDs are sorted in other orders. In one embodiment, a CID mapping engine may calculate CIDs for new content (e.g., via a hashing algorithm as described herein). Content catalog 718 may be responsible for indexing content on the mesh network.

In one embodiment, software daemon 717A-C security may be enforced by the mesh network link layer security. This approach assumes all nodes in the mesh network are authenticated and that no malicious software can be installed on any node at any time. In another embodiment, security considerations may be taken by daemons 717A-C running on non-exploited nodes to prevent malicious software (e.g., running on an exploited node) from performing malicious operations. In one embodiment, only certificated nodes (e.g., a node whose public key is well known) may be allowed to perform critical operations (e.g., content push and delete) by signing in the command signature field with its private key.

Figure 7C:
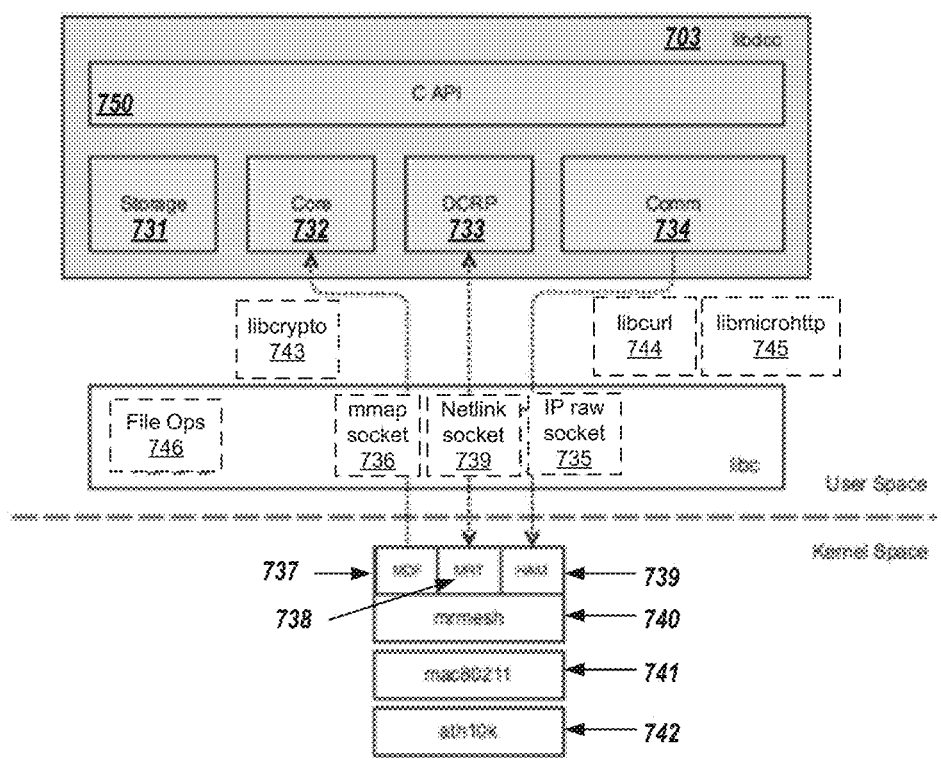
FIG. 7C is a diagram of a software library in which an on-path data caching engine may be implemented according to one embodiment.

FIG. 7C is a diagram of a software library 703 in which an on-path data caching engine may be implemented according to one embodiment. In one embodiment, software library 703 implements a common set of functions. Software library 703 may also publish associated content-caching related APIs 750 so that an external program can communicate with (e.g., D-server 719A-C of FIG. 7B) or be plugged into (e.g., content pre-distributor 715 of FIG. 7B) the on-path data caching system. The core library may be written in C and provide native C/C++ support. Other programming languages are also possible. Software library 703 may include a storage engine 735, core engine 732, content resolution engine 733, and communication engine 724.

In one embodiment, storage engine 73 is responsible for content repository related tasks, including: performing generic content repository management operations (e.g., initializing the repository, adding removing content, etc.), content searching in a local content repository, maintaining content-level metadata (i.e. size, attribute, first and last access timestamp, total access count, last N seconds access counter, etc.), maintaining content-repository-level metadata (e.g., cache space usage, pre-distribution space usage, average cache and pre-distribution hit rate, etc.), and performing content repository maintenance operations (e.g., recalculate space usage, scan repository to verify all the contents match their metadata, etc.).

In one embodiment, the core engine 732 may functionality including: 1) Debugging (log level and severity, console and log file choices, timestamp, hex dump, etc.); 2) Computing checksum values (e.g., using SHA-256); and 3) Creating a Linux zero copy socket 736 with an 802.11s 740 data forwarding interface (MDF 737).

In one embodiment, the content resolution engine 733 implements a content resolution protocol for both requests and replies. A content resolution protocol request may be IP multicast and a reply may be IP unicast. The network stack may translate layer 3 multicast packets into layer 2 data frames. To overcome the unreliable nature of data frames, content resolution engine 733 may send multiple content resolution request frames if it doesn't receive any replies within a protocol defined threshold of time. In one embodiment, when multiple replies (from different content source candidates) are received for a given content, content resolution engine 733 may query a master routing table (MRT) engine 738 via socket interface 739. In another embodiment, content resolution engine 733 may pick the shortest response time replier.

In one embodiment, the communication engine 734 abstracts the communication layer for the software layer. The communication engine 734 may provide HTTP GET and PUT implementation for both client and server modes for content access and distribution, operations to reduce broadcast traffic within the mesh network (e.g., hop-aware multicast via IP raw socket 375 and hop-aware multicast engine 739), and high efficiency reliable broadcast operations for catalog distribution (e.g., to notify receiver nodes of new content CIDs so that receivers can retrieve the CID) data). In one embodiment, software library 703 may include and/or be in communication with various other components, including mac80211 block 741 (e.g., a Linux kernel network stack software component), auth10 k 742 (e.g., a driver for a TCP/IP mesh network adapter), libcrypto 743 (e.g., a library to perform SHA-256 checksums), libcurl 744 (e.g., library to perform TCP client side functionality) and libmicrohttp 745 (e.g., library to handle http requests).

In one embodiment, a command line utility exports software library functions in an application format for easier access. The functions provided by the command line utility may also be performed to create and execute custom implementation on top of software library directly. The command line utility functions may include, for example: content repository creation and maintenance, adding and removing content to and from a local content repository; querying content in the mesh network; pulling and pushing content from and to a remote content repository; and pre-distributing content.

Figure 7D:
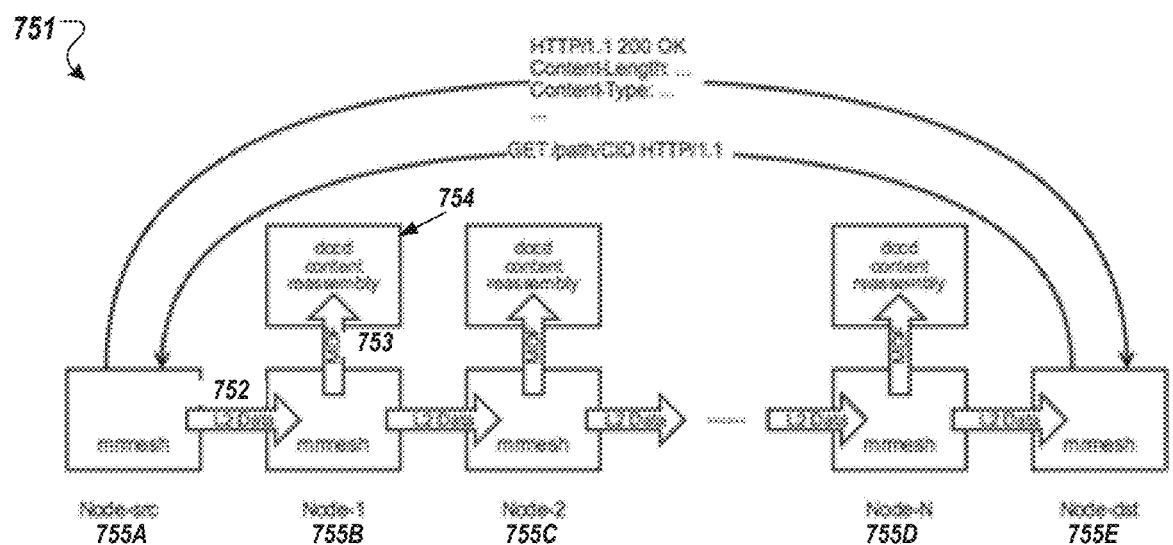
FIG. 7D is a diagram of a content reassembly thread configured to perform on-path data caching operations according to one embodiment.

FIG. 7D is a diagram of a content reassembly thread 751 configured to perform on-path data caching operations according to one embodiment. In one embodiment, the content reassembly thread is responsible for reassembling layer 7 data payload (content) from multiple layer 2 frames. In one example, content reassembly thread 751 receives Ethernet frames 752 via an 802.11s interface, decapsulates the IP, TCP and HTTP protocols to reassemble 754 the content data payload, and stores the data payload to a local content repository. The 802.11s interface 753 sends a copy of forwarded layer 2 data frames 752 to user space, so intermediary nodes 755B-D are able to cache the content of the data frames when it is transmitted from Node-src 755A to Node-dst 755E (e. g, via HTTP GET).

In one embodiment, the 802.11s interface 753 runs in a parallel path with the typical data forwarding path. Advantageously, the parallel design pays zero tax for caching on the regular data forwarding path. In one embodiment, because data frames are forwarded in the kernel space, while the software daemon (e.g., Daemons 717A-C of FIG. 7B) runs in user space, the 802.11s to software daemon path may be optimized for speed. In one embodiment, Linux PACKET_MMAP may be used to create a zero copy packet delivery channel between the 802.11s interface and daemon.

In one embodiment, the content resolution thread is dedicated to replying to content queries. After the thread starts up, it joins a content resolution IP multicast group to listen for request messages. When it detects that a queried CID is stored in the local content repository, it locks the CID in the content repository for a duration of time (e.g., 5 seconds) and sends a reply (e.g., an IP unicast packet) to the inquirer.

In one embodiment, content serving threads are built-in web server implementation to support content transfer over HTTP. The software daemon may specify whether to use the built-in web server (by default) or an external web server (i.e. Apache, Nginx, etc.). For the latter case, the external web server may follow the daemon-specific protocol (e.g., DocRoot and URL) to host the contents in a content repository so that the daemon can work with other components correctly. The built-in web server may be based on GNU libmicrohttpd library, which supports four threading models (select, poll, pthread and thread pool). In one embodiment, the built-in web server may use a dedicated thread to handle multiple HTTP requests by default.

Figure 7E:
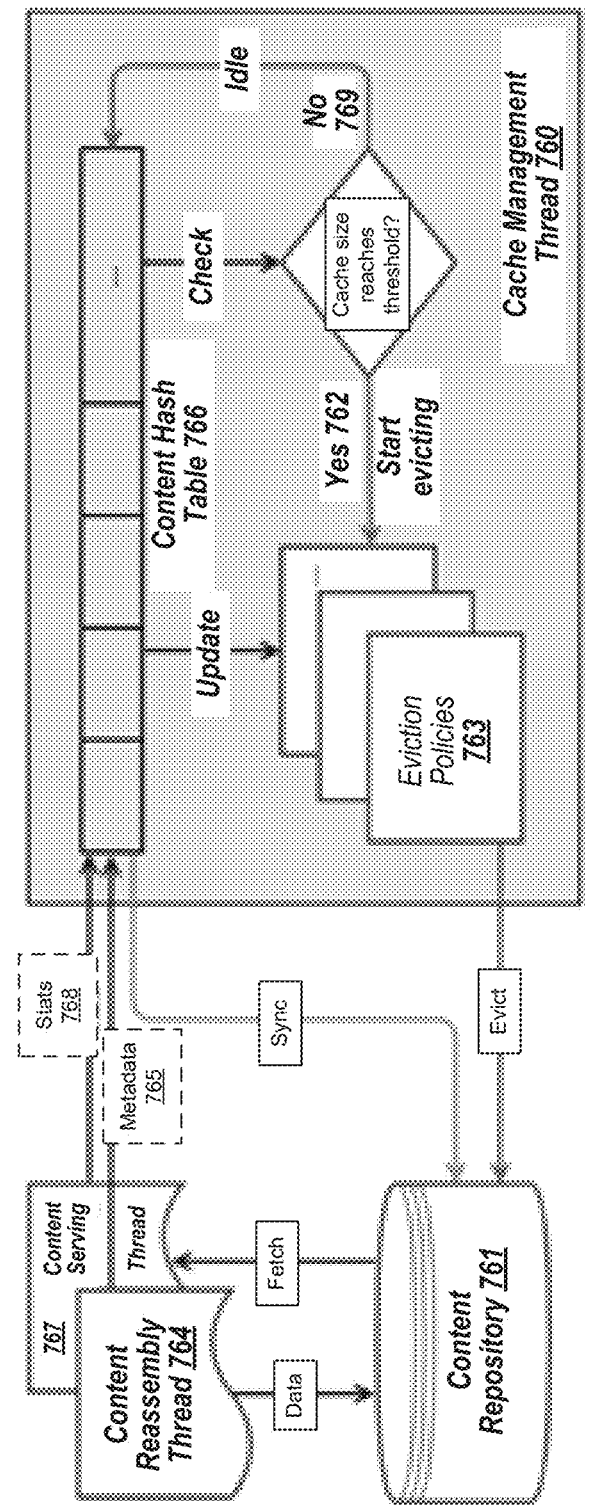
FIG. 7E is a diagram of a cache management thread configured to perform on-path data caching operations according to one embodiment.

FIG. 7E is a diagram of a cache management thread 760 configured to perform on-path data caching operations according to one embodiment. As described above, in one embodiment, the contents of a content repository 761 are divided in two categories: pre-distributed content (original content) and cached content. A pre-distributed content might be the original and only copy of the content in the mesh network, while a cached content may be duplicated copy of the same content whose origin resides on some other node in the network. Pre-distributed contents and cached contents may be stored in the same content repository 761 and each of them has may have their own storage quota. When the total cached contents size reaches or exceeds a storage threshold for the content repository 761, the daemon cache management thread 760 may perform an eviction routine 762. Various cache eviction policies 763 may cause different content to be removed from the content repository. In one embodiment, evictions policies 763 may include least recently used (LRU), least frequently used (LFU), acceleration ranking, cost-based, random, or any combination thereof. Machine learning may be used to determine an optimal eviction policy in view of the objectives.

In one embodiment, after the content reassembly thread 764 successfully reassembles new content, it stores the content data into content repository 761 and the content metadata 765 into the in-memory content hash table (CHT) 766. Content serving thread 767 may provide content accessing updates 768 to CHT 766 according to content serving statistics (e.g., how many requests have been received within during a defined time period, how many downloads have occurred within during a defined time period, etc.). In one embodiment, the more popular a content, the longer the eviction policy delays evicting the content. The content metadata may be organized into a variety of data structures (e.g., LRU, LFU, Last-N-seconds ranking list, etc.). A selected evection policy 763 may begin when the CHT 766 detects the total utilized cache size of the content repository reaches a predefined first storage threshold. The eviction policy 763 may delete selected content (based on the selected eviction policy 763) from the content repository until the total utilized cache size of the repository is below a second storage threshold. The eviction process may then be paused until the total content size exceeds the first storage threshold again. In one embodiment, CHT 766 may also periodically flush content metadata back to the content repository 761 so that metadata survives during unexpected events (e.g. system crash, power outage, etc.).

FIG. 8 illustrates a multi-radio, multi-channel (MRMC) network device 800 according to one embodiment. The MRMC network device 800 includes a metal housing 802 that has eight sectors 804-818. Each of the eight sectors 804-818 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 802. The top portion and the four side portions may be metal surfaces or have portions of metal. Also, the outer top surfaces of the eight sectors form an inner chamber 811 in a center of the metal housing 802. In particular, the sector 808 may be considered a reflective chamber that includes an top portion 830, a first side portion 832, a second side portion 834, a third side portion 836, and a fourth side portion 838. The other sectors 804, 806, 810, 812, 814, 816, and 818 may have similar metal portions or surfaces as reflective chambers as the sector 808. Similarly, the inner chamber 811 can be considered reflective. For example, the circuit board 820 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network device 800 includes a circuit board 820 disposed within the metal housing 802. In particular, the circuit board 820 may include multiple portions, such as a first portion disposed in the inner chamber 811. There may be a second portion of the circuit board 820 disposed within a first sector 804 and a third portion of the circuit board 820 disposed within a second sector 806. These portions may extend to an outer side of the metal housing 802. The circuit board 820 may also include smaller portions that are disposed in the other sectors 808-818 to accommodate some of the antenna pairs disposed within the respective sectors.

In the depicted embodiment, the MRMC network device 800 includes eight pairs of antennas 840, each pair being disposed in one of the eight sectors 804-818. Each pair includes a horizontal orientation antenna and a vertical orientation antenna. The eight pairs of antennas 840 may be disposed on, above, or below corresponding sections of the circuit board 820. In one embodiment, each of the eight pairs of antennas 840 is a pair of cross polarized dipole antennas, a pair of vertical polarized dipole antennas, or a pair of cross polarized patch antennas.

In some embodiments, the MRMC network device 800 includes a top antenna disposed on a top side of the circuit board 820 within the inner chamber 811 and a bottom antenna disposed on a bottom side of the circuit board 820 within the inner chamber 811. In the depicted embodiment, top antennas 842, 844 are disposed above the circuit board 820, and bottom antennas 846, 848 are disposed below the circuit board 820. The top antennas 842, 844 and the bottom antennas 846, 848 are helix coil antennas. In other embodiments, the top and bottom antennas may be other types of antennas, such as patch antennas, monopoles, dipoles, loops, folded monopoles, or the like.

In the depicted embodiment, the eight pairs of antennas 840, the top antennas 842, 844, and the bottom antennas 846, 848 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 830 and the four side portions 832-838 of the sector 808 operate as a reflector chamber for the pair of antennas 840 within the respective chamber. The reflective chamber reflects the electromagnetic energy, radiated by the horizontal orientation antenna, in a first directional radiation pattern with high gain in a direction along a center axis of the sector 808 (e.g., a truncated pyramid structure) and reflects the electromagnetic energy, radiated by the vertical orientation antenna, in a second directional radiation pattern with high gain in the direction along the center axis of the sector 808. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network device 800 includes a first omni-directional antenna 850 (e.g., dual-band WLAN antenna) disposed on the top side of the second portion of the circuit board 820 disposed within the sector 804 (i.e., a first of the eight sectors). In a further embodiment, a second omni-directional antenna 852 is disposed on the top side of the third portion of the circuit board 820 disposed within the sector 806 (i.e., a second of the eight sectors). The first omni-directional antenna 850 and the second omni-directional antenna 852 are designed to radiate electromagnetic energy in the first frequency range (e.g., 5 GHz band) and a second frequency range (e.g., 2.4 GHz band).

In the depicted embodiment, the MRMC network device 800 includes a first cellular antenna 854 (e.g., WWAN antenna) disposed on the top side of the second portion of the circuit board 820 disposed within the sector 804 (i.e., a first of the eight sectors). In a further embodiment, a second cellular antenna 856 is disposed on the top side of the third portion of the circuit board 820 disposed within the sector 806 (i.e., a second of the eight sectors). The first cellular antenna 854 and the second cellular antenna 856 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network device 800 includes a first RF radio (not illustrated in FIG. 8) disposed on the circuit board 820 and coupled to the first cellular antenna 854 and the second cellular antenna 856. The first RF radio causes the first cellular antenna 854, the second cellular antenna 856, or both to radiate the electromagnetic energy in the third frequency range. In a further embodiment, multiple RF radios (not illustrated in FIG. 8) are disposed on the circuit board 820 and coupled to the eight pairs of antennas 840, the top antennas 842, 844, and the bottom antennas 846, 848. The RF radios cause different combinations of one or more of the eight pairs of antennas 840, the top antennas 842, 844, and the bottom antennas 846, 848 to radiate the electromagnetic energy in the first frequency range (e.g., 2.4 GHz band). In a further embodiment, a second RF radio (not illustrated in FIG. 8) is disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the first frequency range (e.g., 5 GHz band).

In the depicted embodiment, the MRMC network device 800 includes a third RF radio (not illustrated in FIG. 8) disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the second frequency range (e.g., 2.4 GHz band).

FIG. 9 is a block diagram of a network hardware device 900 according to one embodiment. The network hardware device 900 may correspond to the network hardware device 102-110 of FIG. 1. In another embodiment, the network hardware device 900 may correspond to the network hardware devices 202-210 in FIG. 2. In another embodiment, the network hardware device 900 may correspond to the mesh node 300 of FIG. 3. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the network hardware device 900. The network hardware device 900 performs functions by using the processor(s) 930 to execute instructions provided by the system memory 906.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first mesh network device in a transmission control protocol/internet protocol (TCP/IP) mesh network, the first mesh network device comprising:
   a content repository comprising a first section to store original data and a second section to store cached data, wherein the original data is data that is first stored in the content repository and the cached data is data that is first stored in a different content repository of a different mesh network device; and
   an application processor operatively coupled to the content repository, wherein the application processor comprises a user space, a kernel space, and an on-path data caching engine, wherein the application processor is to:
      receive, at the kernel space from a second mesh network device, a plurality of data frames via a data link layer of the TCP/IP mesh network, wherein each of the plurality of data frames comprises audio or video data and a content identifier (CID) that identifies the audio or video data;
      store the plurality of data frames in a socket kernel buffer associated with the kernel space;
      determine, at the data link layer, that a third mesh network device is a destination for the plurality of data frames;
      forward the plurality of data frames to the third mesh network device from the socket kernel buffer without processing the plurality of data frames by a higher layer of the TCP/IP mesh network than the data link layer;
      determine, by the on-path data caching engine, that the audio or video data of each of the plurality of data frames is to be cached by the first mesh network device in addition to being forwarded to the third mesh network device; and
      asynchronously copy, independent of the forwarding the plurality of data frames, by the on-path data caching engine, only the audio or video data from the socket kernel buffer to the second section.

2. The first mesh network device of claim 1 wherein to asynchronously copy the audio or video data, a kernel corresponding to the kernel space is to store, in a ring buffer of the application processor, a pointer to a starting physical address of the plurality of data frames stored in the socket kernel buffer, and wherein the on-path data caching engine is further to:
   access the pointer in the ring buffer;
   store a copy of the pointer to a page table associated with the content repository; and
   copy the audio or video data from the socket kernel buffer to the second section.

3. The first mesh network device of claim 2, wherein the on-path data caching engine is further to:
   determine that a size of the audio or video data exceeds a size threshold of the ring buffer; and
   increase a first size of the ring buffer to a second size of the ring buffer.

4. A first mesh network device, in a transmission control protocol/internet protocol (TCP/IP) mesh network, the first mesh network device comprising:
   a content repository comprising a first section to store original data and a second section to store cached data; and
   an application processor operatively coupled to the content repository, wherein the application processor comprises an on-path data caching engine, wherein the application processor is to:
      receive, from a second mesh network device, first data via a data link layer of the TCP/IP mesh network, the first data comprising payload data and a content identifier (CID) that identifies the payload data;
      store the first data in a kernel buffer;
      determine that a third mesh network device is a destination for the first data;
      forward the first data to the third mesh network device from the kernel buffer via the data link layer without processing the first data by a higher layer than the data link layer;
      asynchronously copy the payload data from the kernel buffer to the content repository;
      receive a request from a fourth mesh network device for the payload data, wherein the request comprises the CID that identifies the payload data;
      determine that the payload data is stored in the content repository; and
      send the payload data to the fourth mesh network device.

5. The first mesh network device of claim 4, wherein the on-path data caching engine is further to:
   receive a request from fourth mesh network device for second data content, wherein the request comprises a CID that identifies the second data content;
   determine that the second data content is among the original data stored in the first section; and
   send the second data content to the fourth mesh network device.

6. The first mesh network device of claim 4, wherein the on-path data caching engine is further to:
   determine that a size threshold of the second section has been exceeded; and
   evict data from the second section.

7. The first mesh network device of claim 4, wherein the CID is a hash value of the payload data.

8. The first mesh network device of claim 7, wherein the on-path data caching engine is further to map the CID to a source internet protocol (IP), destination IP, source port, and destination port.

9. The first mesh network device of claim 4, wherein to asynchronously copy the payload data, a kernel of the application processor is to store a pointer to a starting physical address of the first data in a ring buffer of the application processor, and wherein the on-path data caching engine is further to:
   access the pointer to the starting physical address in the ring buffer;
   store the pointer to the starting physical address to a page table associated with the content repository; and
   copy the payload data from kernel buffer to the content repository.

10. The first mesh network device of claim 9, wherein the on-path data caching engine is further to:
    determine that a size of the first data exceeds a size threshold of the ring buffer; and increase a first size of the ring buffer to a second size of the ring buffer.

11. The first mesh network device of claim 4, wherein a plurality of Ethernet data frames comprises the payload data, and wherein the on-path data caching engine is further to reassemble the payload data from the Ethernet data frames and store the payload data in the content repository.

12. The first mesh network device of claim 4, wherein the on-path data caching engine is further to:
lock the payload data from being moved from the content repository for a time duration; and
send a notification to the fourth mesh network device indicating that the payload data is stored in the content repository.

13. A method comprising:
receiving, by an application processor of a first mesh network device in a transmission control protocol/internet protocol (TCP/IP) mesh network, from a second mesh network device, a frame via a data link layer of the TCP/IP mesh network, the frame comprising payload data;
storing the payload data in a kernel buffer of the application processor;
determining, by the application processor, that a third mesh network device is a destination for the frame;
forwarding, by the first mesh network device, the frame to the third mesh network device from the kernel buffer via the data link layer without processing the first data by a higher layer than the data link layer;
asynchronously copying, by the application processor, only the payload data from the kernel buffer to a content repository of the first mesh network device, wherein the content repository is configured to store original data and cached data, the cached data comprising the data payload;
receiving a request from a fourth mesh network device for the payload data, wherein the request comprises a content identifier (CID) that identifies the payload data;
determining that the payload data is stored in content repository; and
sending the payload data to the fourth mesh network device.

14. The method of claim 13, wherein to asynchronously copy the payload data, the method further comprises:
storing, by a kernel of the application processor, a pointer to a starting physical address of the payload data in a ring buffer of the application processor;
access, by an on-path data caching engine of the application processor, the pointer to the starting physical address in the ring buffer;
store, by the on-path data caching engine, the pointer to the starting physical address to a page table associated with the content repository; and
copy, by the on-path data caching engine, the payload data from the kernel buffer to the content repository.

15. The method of claim 14, the method further comprising:
determining that a size of the payload data exceeds a size threshold of the ring buffer; and
increasing a first size of the ring buffer to a second size of the ring buffer.

16. The method of claim 13, wherein the CID is a hash value of the payload data.

17. The method of claim 13, further comprising:
locking the payload data from being moved from the content repository for a time duration; and
sending a notification to the fourth mesh network device indicating that the payload data is stored in the content repository.

* * * * *